(12) United States Patent
Baloga et al.

(10) Patent No.: US 6,206,470 B1
(45) Date of Patent: Mar. 27, 2001

(54) CHILD SAFETY SEAT

(75) Inventors: Thomas Charles Baloga, Fort Mill, SC (US); David William Burleigh, Bognor Regis (GB)

(73) Assignee: Britax Child Safety Inc., Fort Mills, SC (US)

( * ) Notice: Subject to any disclaimer, the term of this patent is extended or adjusted under 35 U.S.C. 154(b) by 0 days.

(21) Appl. No.: 09/304,764

(22) Filed: May 4, 1999

Related U.S. Application Data
(60) Provisional application No. 60/085,883, filed on May 18, 1998.

(51) Int. Cl.[7] .................................. A47D 1/10; B60N 2/28
(52) U.S. Cl. ..................................... 297/250.1; 297/284.9; 297/391
(58) Field of Search ............................. 297/250.1, 284.9, 297/452.34, 452.36, 391

(56) References Cited

U.S. PATENT DOCUMENTS

| | | | |
|---|---|---|---|
| 4,278,291 | * | 7/1981 | Asai ........................... 297/216.12 X |
| 4,370,000 | | 1/1983 | Kazaoka et al. . |
| 4,653,805 | * | 3/1987 | Maloney ........................ 297/284.9 |
| 4,657,304 | * | 4/1987 | Heesch et al. ..................... 297/391 |
| 4,762,367 | * | 8/1988 | Denton ........................... 297/391 X |
| 4,856,848 | * | 8/1989 | O'Sullivan ....................... 297/391 |
| 5,098,157 | | 3/1992 | Surot . |
| 5,496,092 | * | 3/1996 | Williams et al. ................. 297/250.1 |
| 5,645,317 | * | 7/1997 | Onishi et al. ................... 297/250.1 |
| 5,669,665 | * | 9/1997 | Nowak ........................ 297/284.9 X |
| 5,681,084 | * | 10/1997 | Yoneda ........................... 297/284.9 |
| 5,904,405 | * | 5/1999 | Wu ........................... 297/216.12 X |

FOREIGN PATENT DOCUMENTS

| | | |
|---|---|---|
| 44 46 595 A1 | 10/1995 | (DE) . |
| 0 635 394 A1 | 1/1995 | (EP) . |
| 2 730 460 | 8/1996 | (FR) . |
| 92/09451 | 6/1992 | (WO) . |

OTHER PUBLICATIONS

Japanese Abstract, vol. 008, No. 160(M–312) dated Jul. 25, 1984 and JP 59 057038A to Mitsubishi Jidosha Kogyo).

* cited by examiner

*Primary Examiner*—Peter M. Cuomo
*Assistant Examiner*—Rodney B. White
(74) *Attorney, Agent, or Firm*—Davis and Bujold

(57) ABSTRACT

A child safety seat for use in a vehicle, comprises a seat body having a seat portion, a backrest and side wings projecting from each side of the backrest at the level of the head of a child occupant of the seat. The side wings are moveable relative to the backrest so as to be displaceable between a normal position and a fully deployed position in which they project from the backrest to a greater extent than when in their normal position.

16 Claims, 12 Drawing Sheets

CHILD SAFETY SEAT

This application claims benefit to U.S. Provisional Ser. No. 60/085,883 filed May 18, 1998.

FIELD

This invention relates to a child safety seat for use in a vehicle, of the type comprising a seat body having a seat portion, a backrest and side wings projecting from each side of the backrest at the level of the head of a child occupant of the seat.

SUMMARY OF THE INVENTION

According to the invention, in a child safety seat of the type described above, the side wings are mounted for movement relative to the backrest so as to be displaceable between a normal position and a fully deployed position in which they project from the backrest to a greater extent than when in their normal position.

When in their deployed position, such wings provide enhanced protection for a child occupant of the seat in the event that the vehicle to which it is fitted is subject to having a component acceleration in the transverse direction, for example if the vehicle is subject to side impact.

In a preferred form of the invention, the child safety seat includes drive means for moving the side wings from their normal position to their deployed position in response to actuation of an inertia sensor. Both wings may be arranged for simultaneous deployment. Alternatively, the arrangement may be so as to deploy only the wing on the side towards which the child safety seat is being accelerated, such wing thus being interposed between the child occupant and external objects penetrating into the passenger compartment of the vehicle as a result of side impact. The side wings may also be arranged for manual deployment so as to allow the seat to be used with both wings already deployed, if desired.

DETAILED DESCRIPTION OF THE PREFERRED EMBODIMENT

Figures 1, 3:
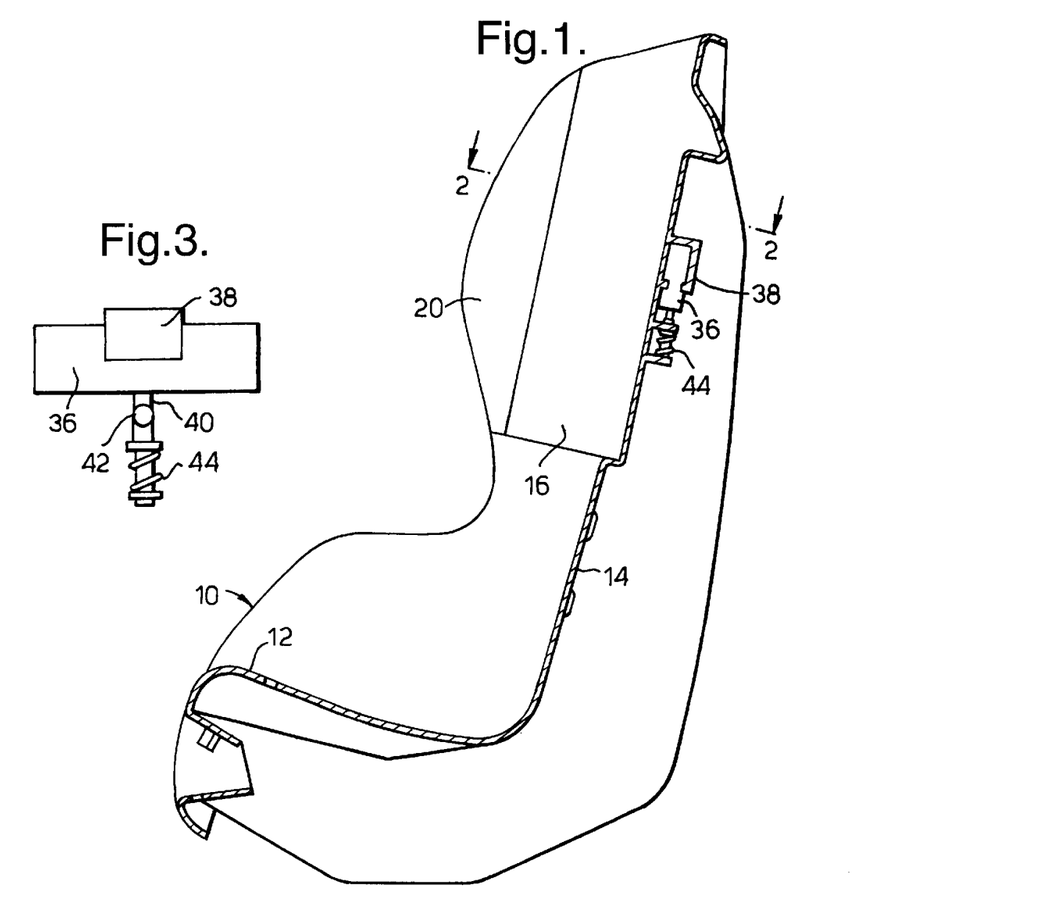
FIG. 1 is a cross-sectional view on the longitudinal centre line (line 1—1 in FIG. 2) of a child seat in accordance with a first embodiment of the invention with the side wings in their normal position.
FIG. 3 is a scrap view from behind the seat of an inertia sensor for the seat shown in FIG. 1.
Figure 2:
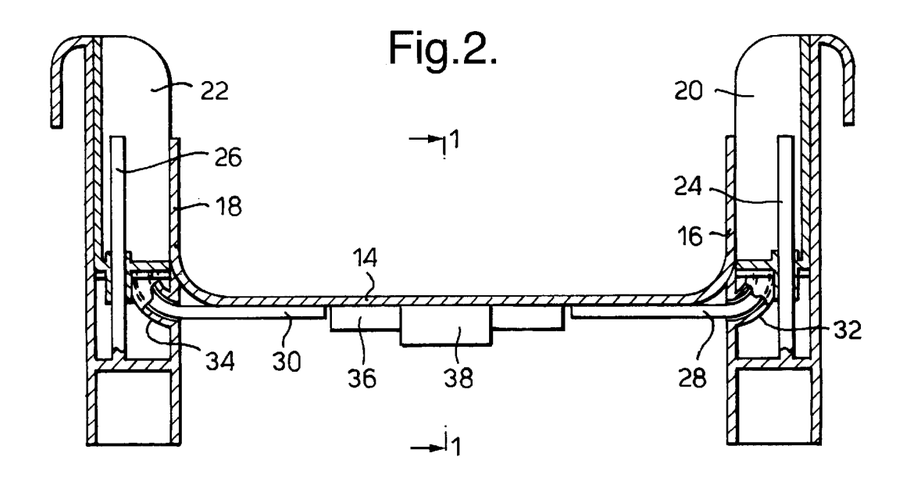
FIG. 2 is a cross-sectional view taken on the line 2—2 in FIG. 1.

FIGS. 1 and 2 show a child safety seat comprising a moulded shell 10 having a seat portion 12, a backrest 14 and integrally moulded fixed side wings 16 and 18. Respective side wing extensions 20, 22 are slidably mounted on respective slide guides 24, 26 for movement in a longitudinal direction between a normal position illustrated in FIGS. 1 and 2 and a fully deployed position illustrated in FIGS. 4 and 5 in which they project further from the backrest 14.

As can be best be seen in FIG. 2, a respective semi-rigid pusher 28, 30 extends from the end of each movable side wing 20, 22 nearer to the backrest 14, round a respective curved slide guide 32, 34 and across the rear of the backrest 14 into close proximity to an inertia mass 36. The inertia mass 36 is slidably mounted in a guide channel 38 which extends horizontally on the back of the backrest 14 above the pushers 28 and 30. A projection 40 (FIG. 3), with a concave lower surface, is formed on the bottom surface of the inertia mass 36. A ball catch 42 is urged into engagement with into this concave lower surface by a compression spring 44.

Figures 4, 6:
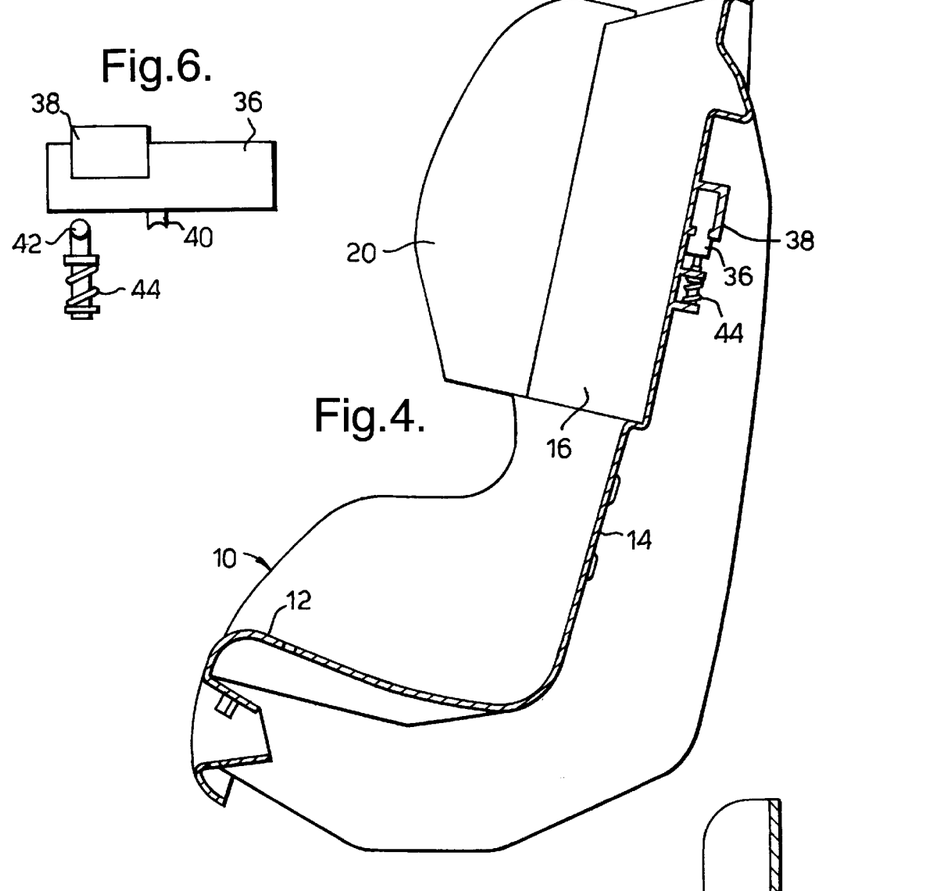
FIGS. 4, 5 and 6 are views corresponding to FIGS. 1, 2 and 3 respectively, showing the inertia sensor activated and one of the side wings in its fully deployed position.
Figure 5:
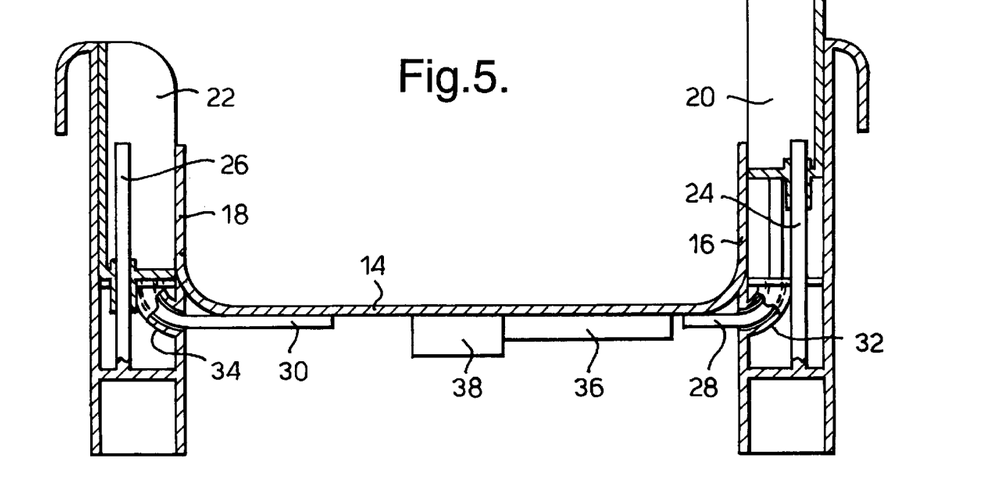

In use, the seat shell 10 may be subject to lateral acceleration, for example because a vehicle in which it is installed is subject to side impact or rollover. Provided that the resulting acceleration is sufficient to overcome the resistance of the ball catch 42, the inertia mass 36 slides in the channel 38 as shown in FIG. 6. For example, if the seat is subject to acceleration in the direction from the side wing 16 to the side wing 18, then the inertia mass 36 tends to lag behind the resulting movement of the seat shell 10, so as to engage with the pusher 22 and thereby push the side wing 22 to its fully deployed position, as shown in FIGS. 4 and 5. Consequently, if as a result of the side impact, some object engages with the deployed side wing 20, the latter serves to protect the head of a child occupant of the seat.

FIGS. 7 to 12 show a modified version of the child seat shown in FIGS. 1 to 6. The seat shell 10, the movable side wings 20 and 22 and their slide guides 24 and 26 are identical with the corresponding components of the embodiment of FIGS. 1 to 6 and will not be described again in detail.

Figure 8:
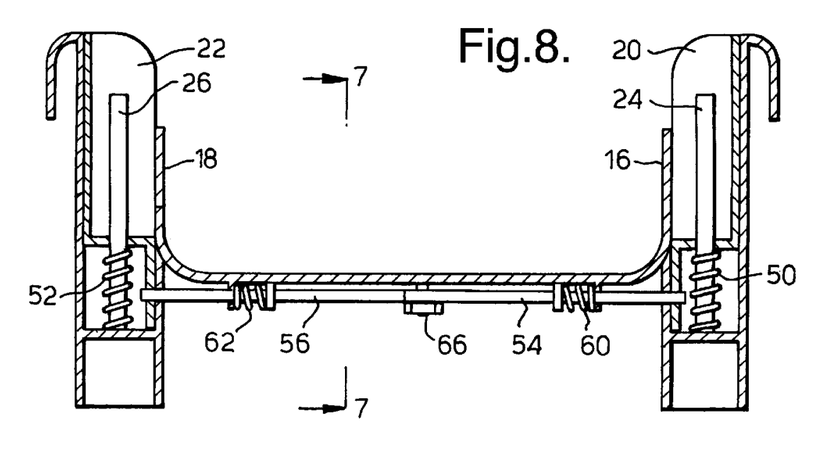
Figures 10, 11, 12:
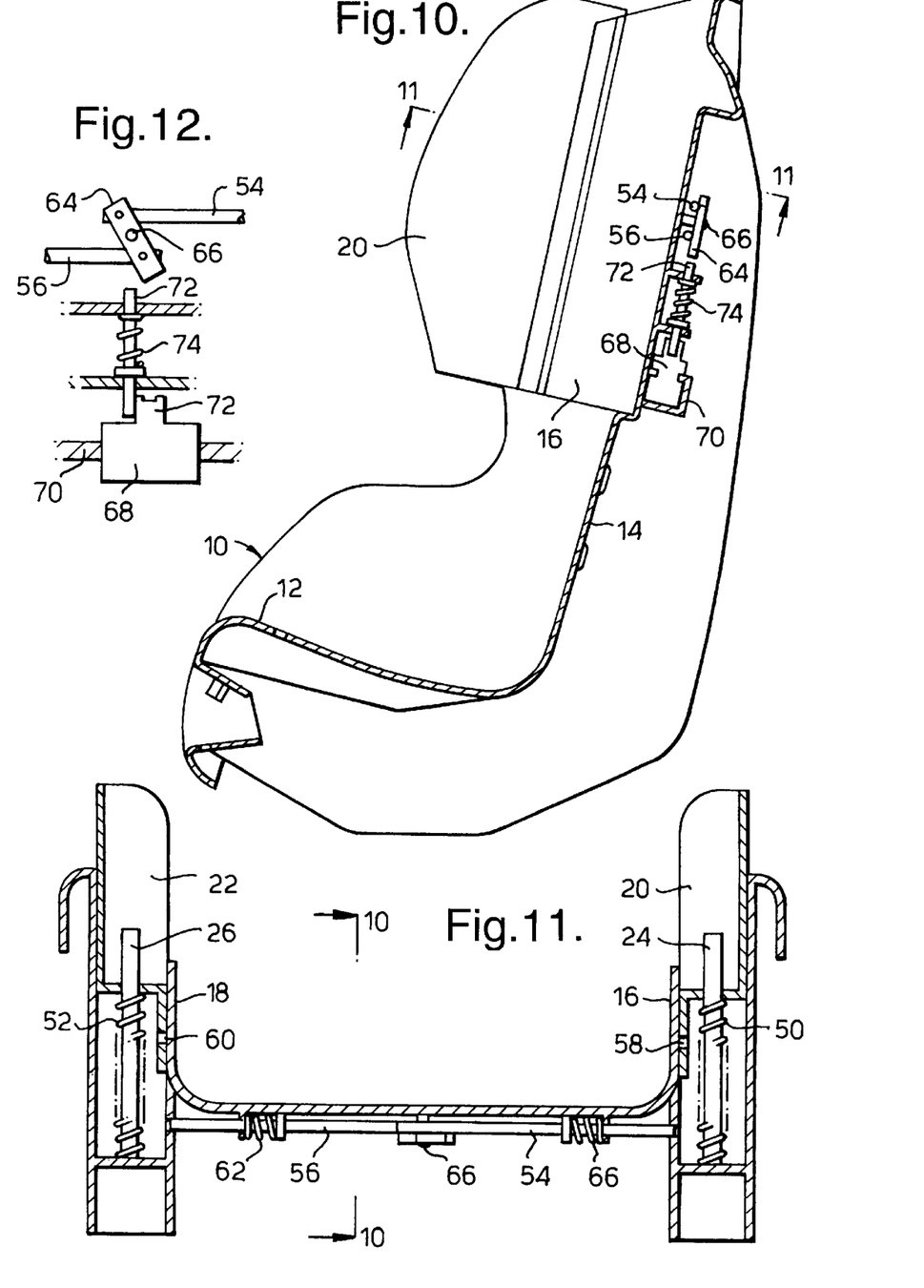

As can best be seen in FIGS. 8 and 11, respective compression springs 50 and 53 bias the movable side wings 20 and 22 to their deployed position. Slide rods 54 and 56 are engageable in respective holes 58 and 60 in the movable side wings 20 and 22 respectively so as to hold them in their stowed position against the action of the compression springs 50 and 52. The slide rods 54 and 56 are biased out of engagement with the holes 58 and 60 by respective compression springs 60 and 62.

Figures 7, 9:
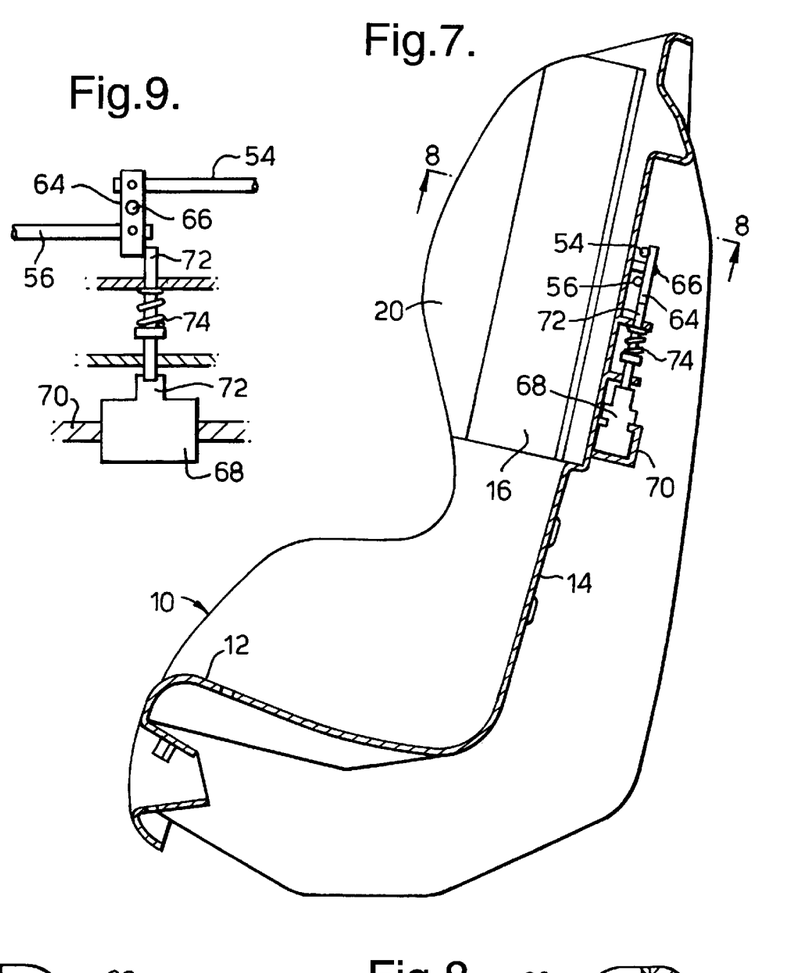
FIGS. 7 to 12 are views corresponding to FIGS. 1 to 6 of a second embodiment of the invention.

As can be seen in FIG. 9, the inboard ends of the slide rods 54 and 56 are pivotally connected to a link 64 which is mounted on the seat back 13 by a central pivot pin 66 (see also FIG. 7). An inertia weight 68 is mounted in a slide channel 70 on the seat back 14 and has a projection 72 containing a concave recess which receives one end of a detent rod 74, the other end of which engages with the link 64 so as to hold the rods 54 and 56 in engagement in the holes 58 and 60 in the movable side wings 20 and 22.

In the event of impact producing sufficient lateral acceleration to disengage the rod 74 from the recess in the projection 72 against the action of the compression spring 76 as shown in FIG. 12, the rods 54 and 56 are disengaged from the holes 58 and 60 by the compression springs 60 and 62. This allows the compression springs 50 and 52 to displace both movable side wings 20 and 22 to their respective deployed positions as shown in FIGS. 10 and 11.

Figure 13:
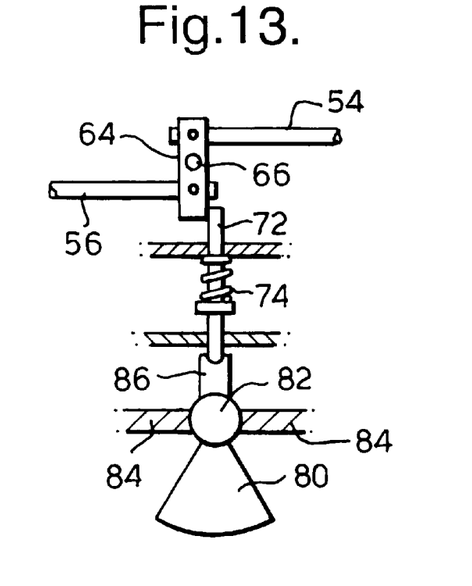
FIGS. 13 and 14 are scrap views from behind the seat of a first alternative to the inertia sensor shown in FIGS. 9 and 12.
Figure 14:
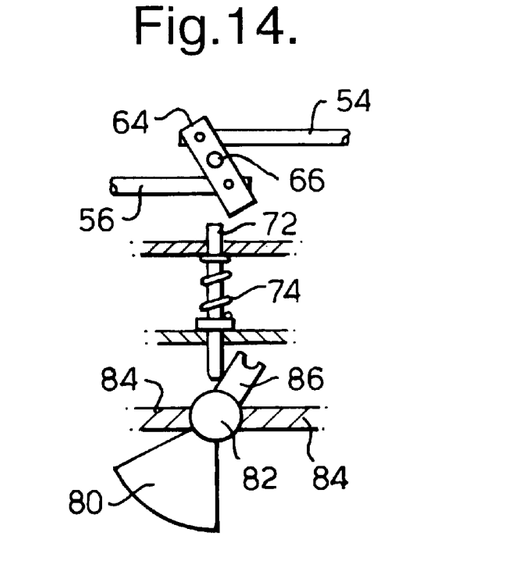

FIG. 13 shows an alternative inertia sensor for use with the child seat shown in FIGS. 7, 8, 11 and 12. The sliding inertia mass 68 is replaced by a pendulum 80 having a spherical formation 82 which is received in bearings 84 secured to the seat back 14. An upwardly extending projection 86 on the pendulum 80 has a concave top surface for engagement with the rod 74. As shown in FIG. 14, if the pendulum 80 is subject to sufficient lateral acceleration to disengage the projection 86 from the rod 74, against the action of the compression spring 76, the rods 54 and 56 are free to disengage from the movable side wings 20 and 22 as before.

Figure 15:
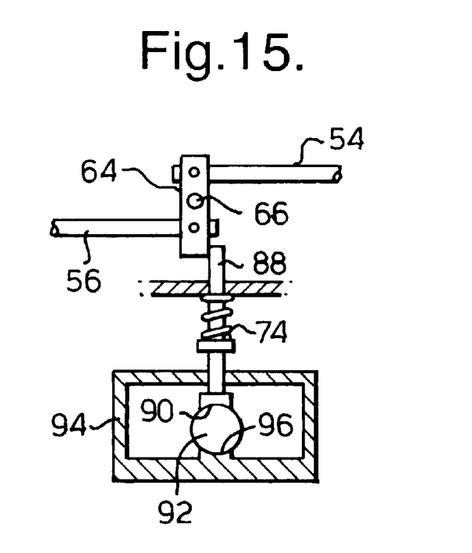
FIGS. 15 and 16 are scrap views from behind the seat of a second alternative to the inertia sensor shown in FIGS. 9 and 12.
Figure 16:
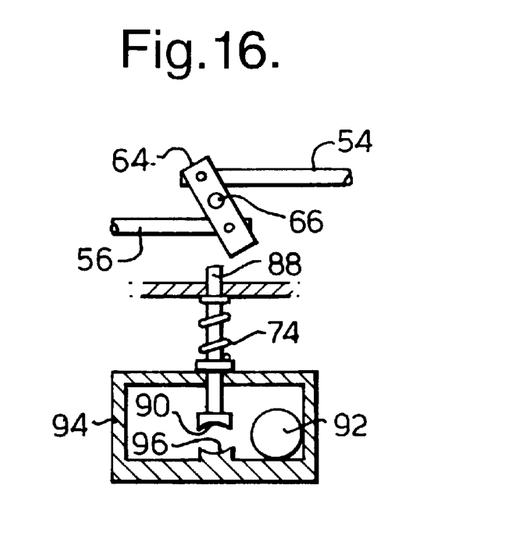

FIG. 15 shows another inertia sensor in which the detent rod 74 is replaced by a detent rod 88 having a concave formation 90 on its bottom end. An inertia mass in the form of a sphere 92 is contained in a housing 94 and received between the concave formation 90 on the bottom of the detent rod 88 and a similar concave formation 96 on the bottom of the enclosure 94. As shown in FIG. 16, if the sphere 92 is subject to sufficient lateral acceleration to overcome the compression spring 76, the rods 54 and 56 are allowed to disengage as before.

Figure 17:
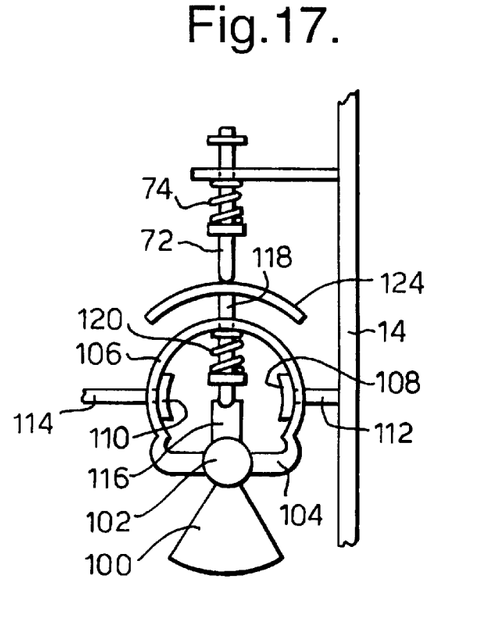
FIGS. 17 to 20 are scrap views from one side of the seat of a third alternative to the inertia sensor shown in FIGS. 9 and 12.

FIG. 17, which is a view from the opposite side of the seat from FIGS. 7 and 10, shows yet another inertia sensor which can be adjusted to compensate for changes in orientation of the seat back 14, for example as the seat shell 10 is reclined. The sensor comprises a pendulum 100 (similar to the pendulum 80) having a spherical formation 102 which is mounted in bearings formed in a gimbles 104, the upper part 106 of which is of hollow cylindrical shape. The gimbles 104 is supported on convex shoes 108 and 110 which engage within the inner surface of the upper part 106 and which are mounted on respective rods 112 and 114 projecting through slots (not shown) in the upper part 106. The rod 112 is secured to the seat back 14 while the rod 114 is movably mounted thereon, as will be explained hereinafter.

The pendulum 100 has an upper projection 116 with a concave top surface which, when the pendulum 110 is in its neutral position, is concentric with the cylinder axis of the cylindrical part 106. A coupling rod 118 is biased by a spring 120 into engagement with the concave recess in the projection 116. A cylindrical cap 124 on the upper end of the coupling rod 118 is also concentric with this cylinder axis. The bottom end of a detent rod 72, identical with the correspondingly numbered detent rod of FIGS. 13 and 14, has its bottom end biased into engagement with the cap 124.

Figure 18:
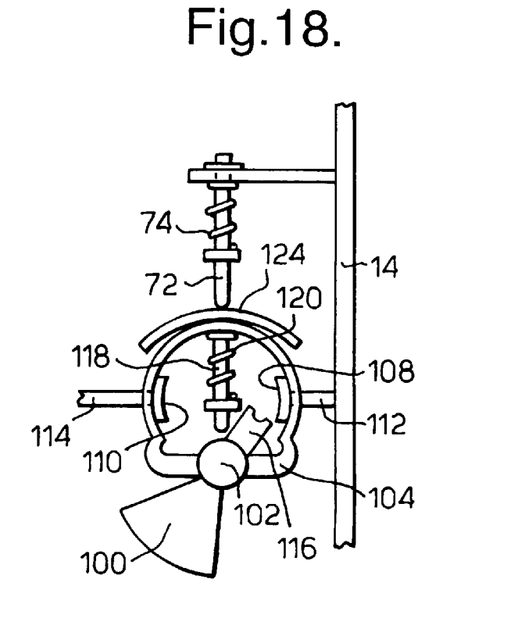

If the pendulum 100 is subject to acceleration in any horizontal direction, the rod 118 disengages from the top projection 116 of the pendulum 100 (FIG. 18), allowing the detent rod 72 to free the slide rods 54 and 56 (FIGS. 8 and 11) from the movable side wings 20 and 22.

Figure 19:
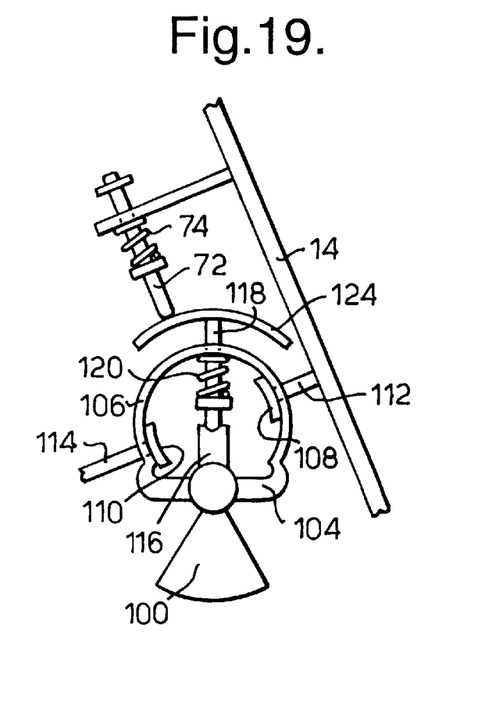
Figure 20:
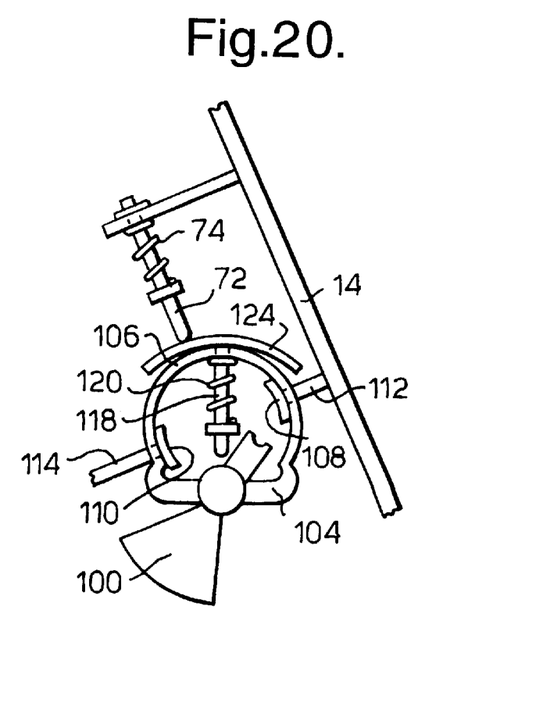

Normally, the rod 114 is urged outwardly so as to lock the gimbles 106 in its preset orientation. If the orientation of the seat shell is to be changed, the force on the rod 114 is relaxed so that the resistance to angular movement of the gimbles 106 relative to the bearing surfaces 108 and 110 is less than the force necessary to displace the pendulum 100 against the action of the compression spring 120. This allows the gimbles 106 to tilt, as shown in FIG. 19. When the pendulum 100 has taken up a vertical position with the gimbles 104 in its new orientation, the shoes 108 and 110 can be moved back to their engaged position. If the pendulum 100 is subject to acceleration in any horizontal direction with the gimbals 104 in this new orientation, the rod 118 disengages from the top projection 116 of the pendulum 100, as shown in FIG. 20.

Figure 23:
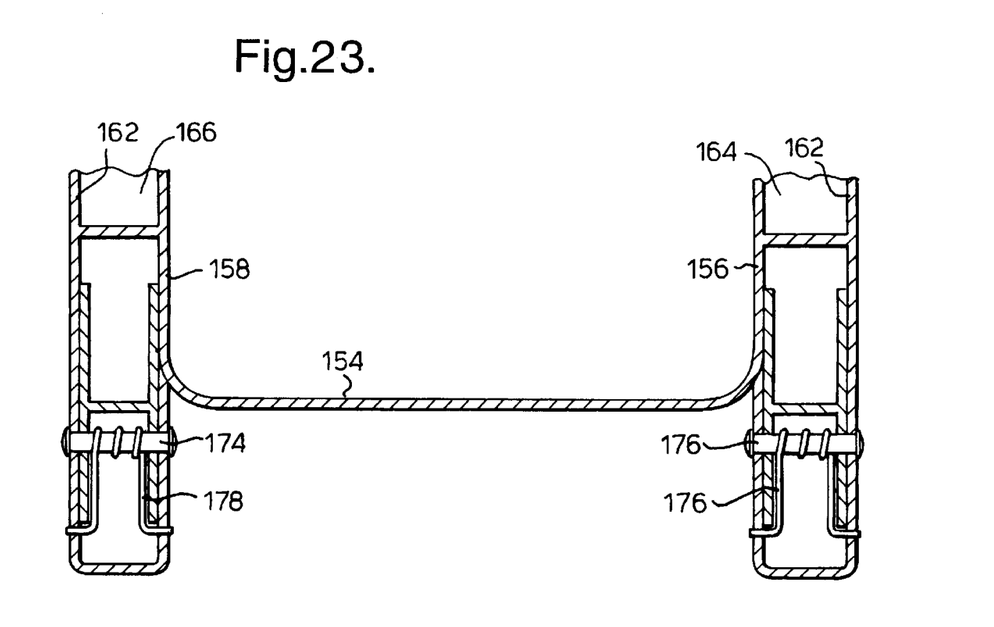
FIG. 23 is a cross-sectional view taken on the line 23—23 in FIG. 21.
Figure 24:
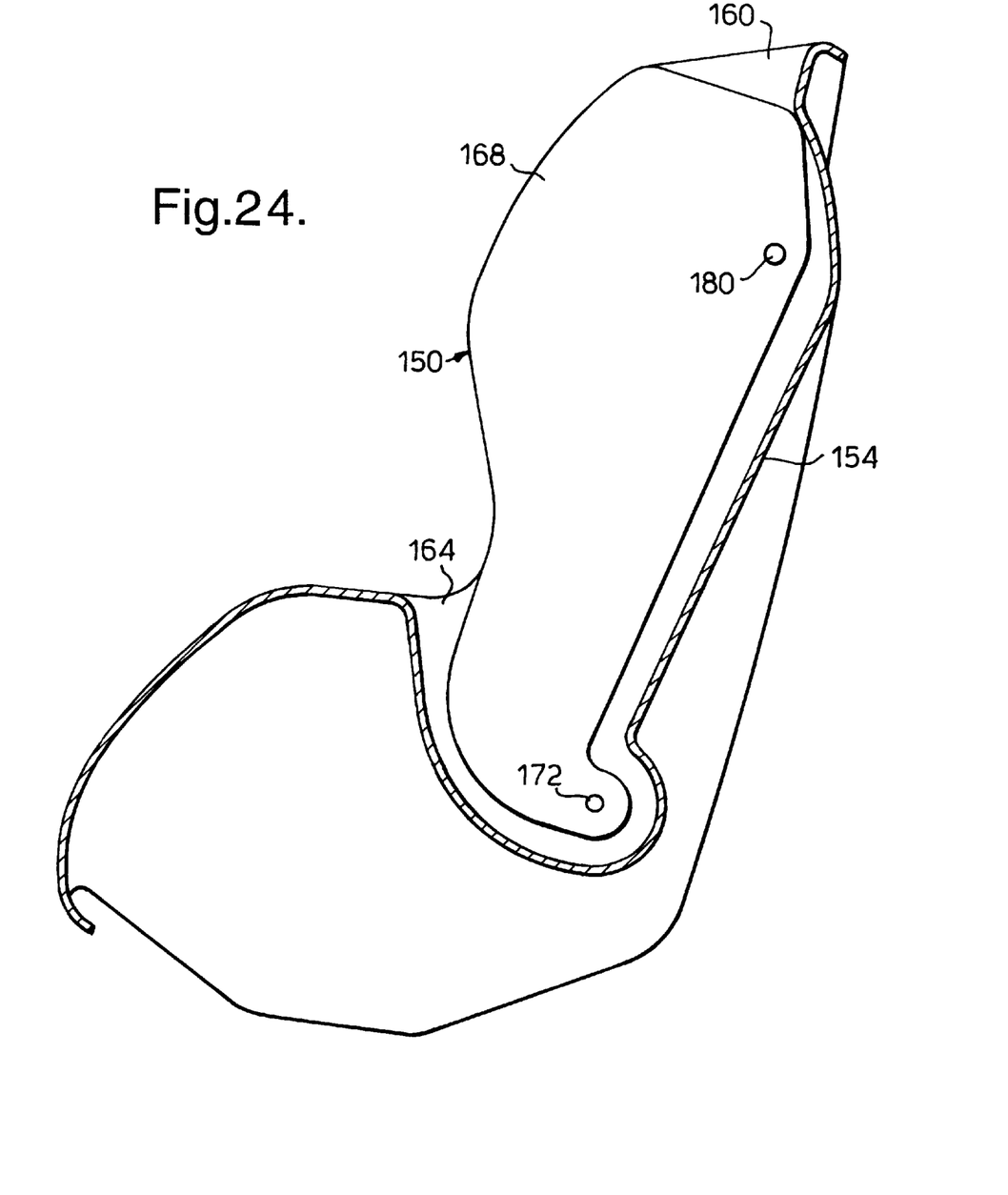
FIG. 24 is a cross-sectional view taken on the line 24—24 in FIG. 22.

Referring to FIGS. 21 to 24, another child safety seat in accordance with the invention comprises a moulded shell 150 having a seat portion 152, a backrest 154 and integrally moulded fixed inner side wings 156 and 158. A respective outer side wing 160, 162 is moulded integrally with each inner side wing 156 and 158 so as to provide a respective slot 164, 166 therebetween. Each slot 164, 166 is open at its front edge and has a respective side wing 168, 170 pivotally mounted therein on a respective pivot pin 172, 174 (FIG. 23). Each of the movable side wings 168, 170 is biased in a counter-clockwise direction (as viewed in FIGS. 21 and 24) by respective springs 176, 178 but retained in the position illustrated in FIGS. 21 to 24 by respective plungers 180 and 182.

The plungers 180 and 182 are slidably mounted on the outer side wings 160 and 162 so as to be movable into and out of engagement with holes 184 (FIGS. 25 to 27) in the movable side wings 168 and 170. Each plunger 180 and 182 is biased into engagement with the corresponding hole 184 by a respective compression spring 186, 188 (FIG. 22) and each has a respective inertia weight 190, 192 on its outer end.

Figure 21:
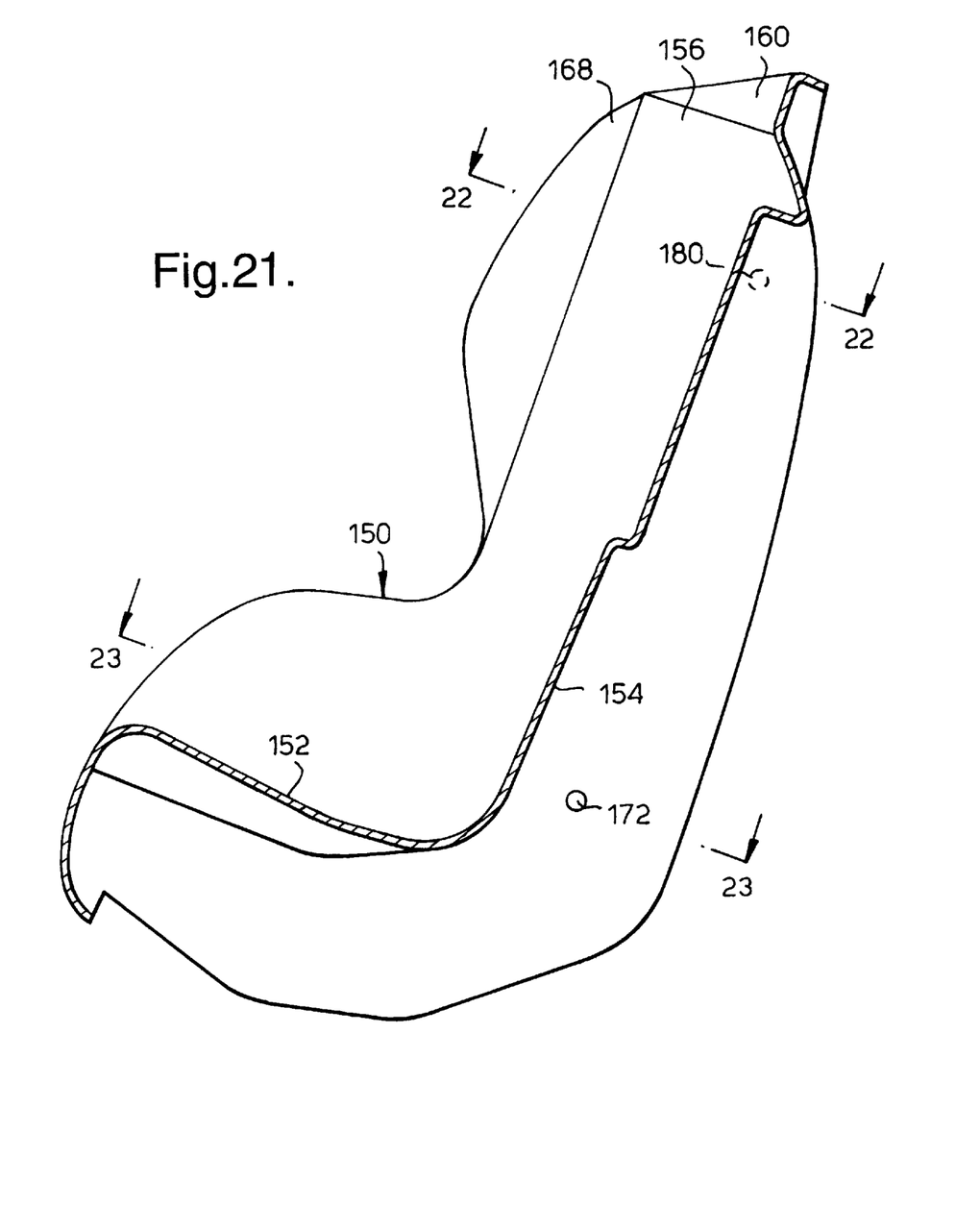
FIG. 21 is a cross-sectional view on the longitudinal centre line (line 21—21 in FIG. 22) of a child seat in accordance with a third embodiment of the invention with the side wings in their normal position.
Figure 22:
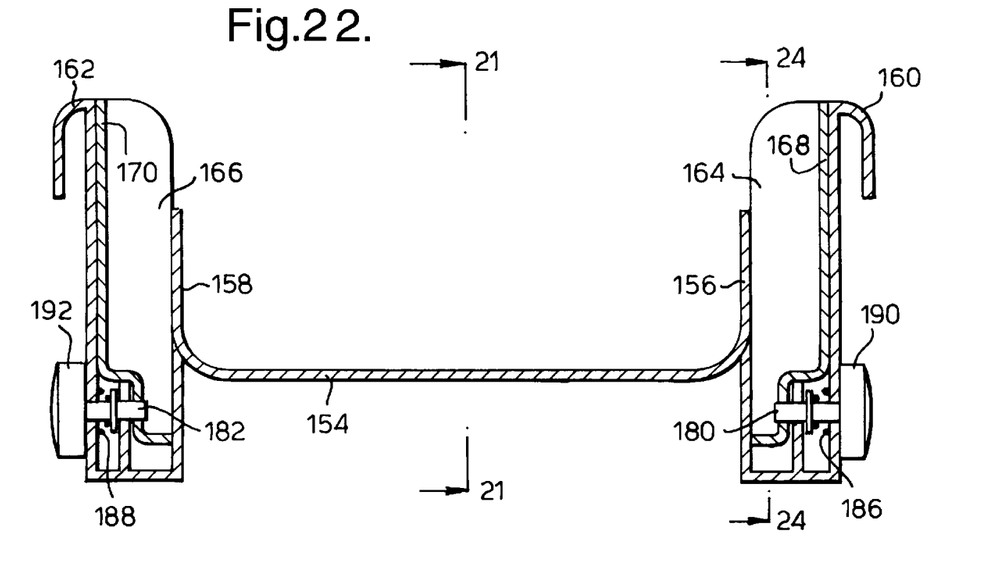
FIG. 22 is a cross-sectional view taken on the line 22—22 in FIG. 21.
Figure 25:
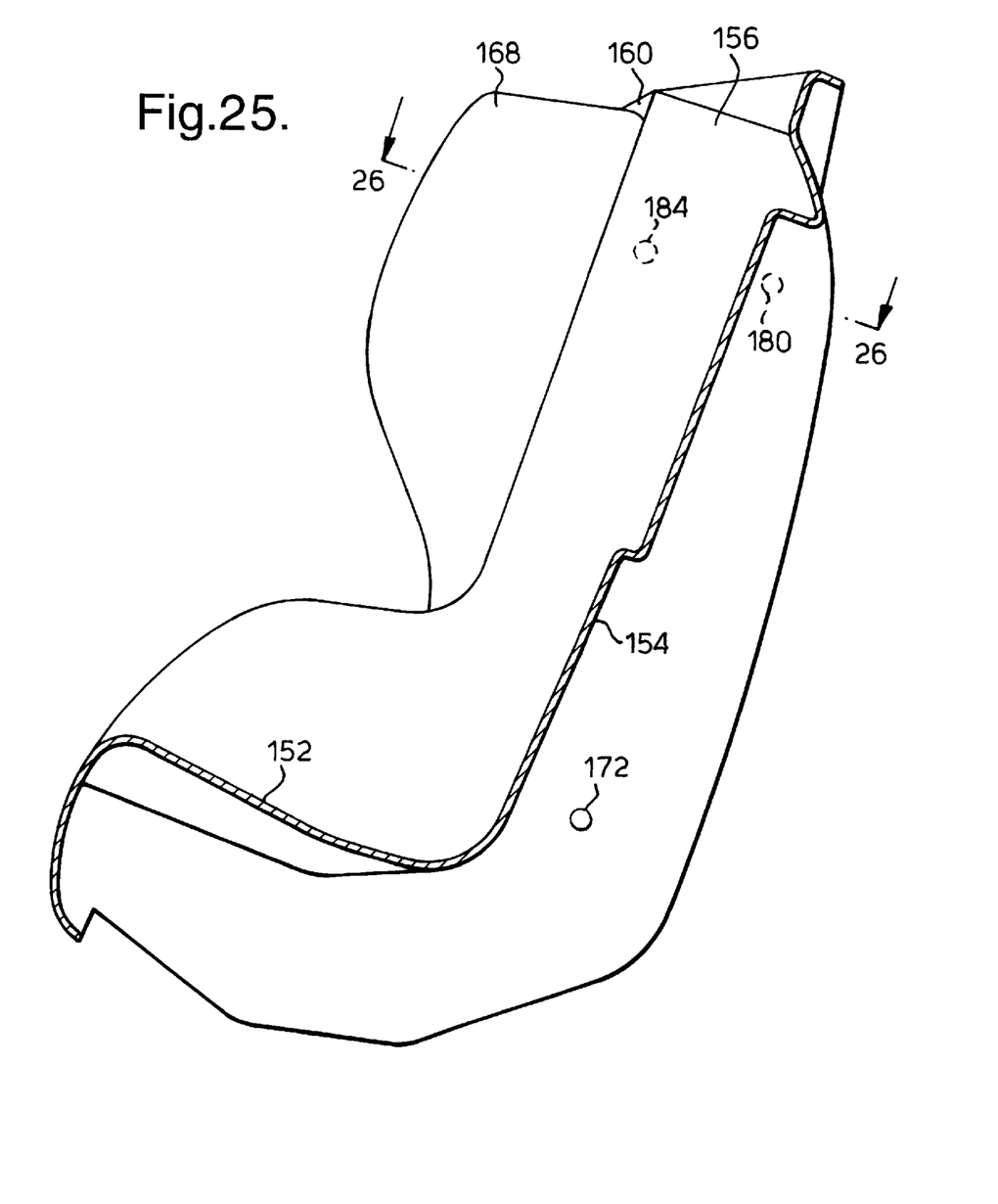
FIG. 25 is a view corresponding to FIG. 21 showing the inertia sensor activated and one of the side wings in its fully deployed position.
Figure 26:
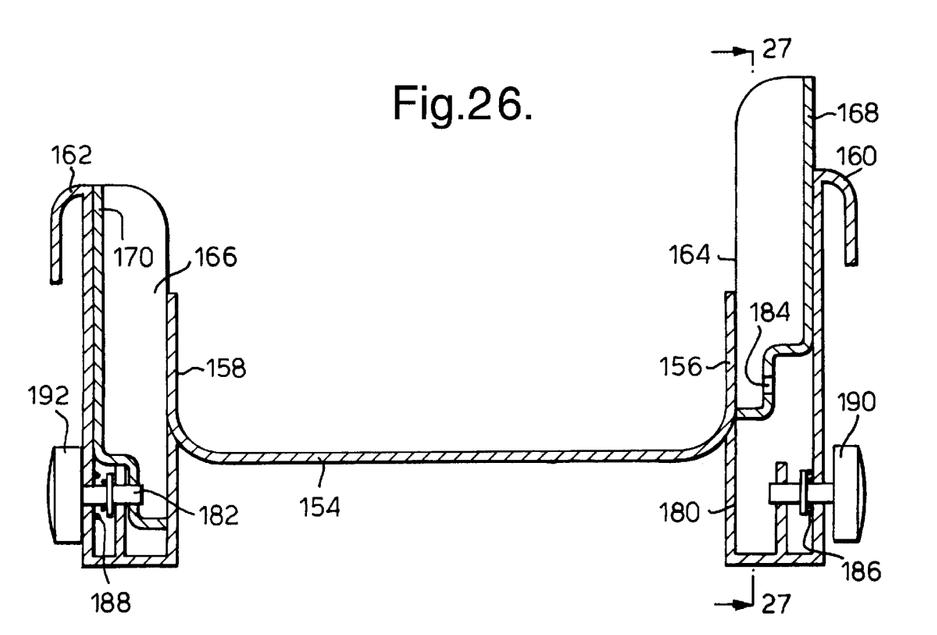
FIG. 26 is a cross-sectional view taken on the line 26—26 in FIG. 25.
Figure 27:
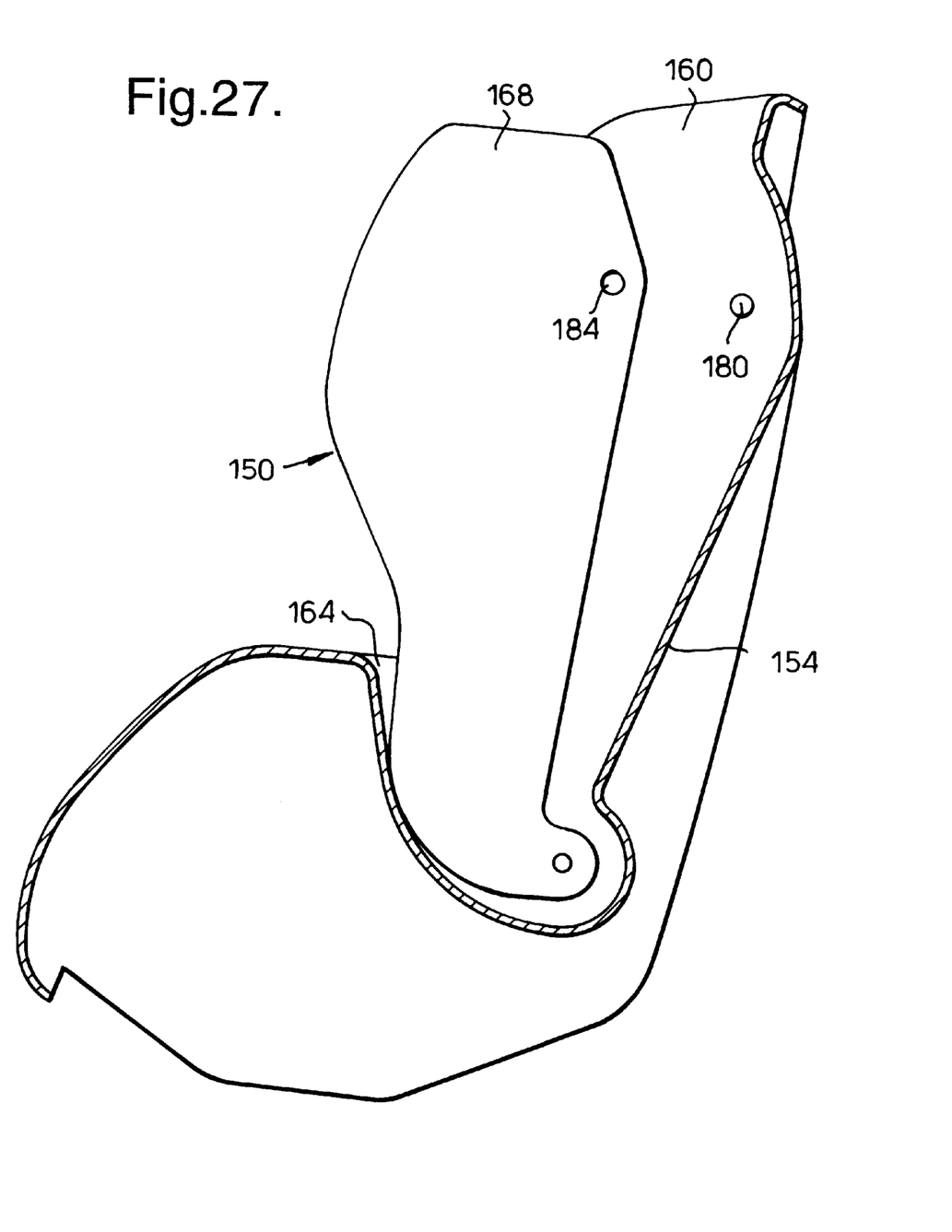
FIG. 27 is a cross-sectional view taken on the line 27—27 in FIG. 26.

In the event that the child seat 10 is subject to rapid acceleration from right to left, as viewed in FIGS. 21 and 23, for example because of impact on the outer side wing 160, the inertia weight 190 tends to lag behind, compressing the spring 186. This allows the plunger 180 to disengage from the hole 184 in the movable side wing 168, which therefore pivots under the action of the spring 176 so that its upper end projects forwardly beyond the outer side wall 160, as shown in FIGS. 25 to 27. After such an incident, the movable side wing 168 can be returned to its stowed position, illustrated in FIGS. 21 to 24, by pressing it inwards while holding the inertia weight 190 in its outer position, until the hole 184 is aligned with the plunger 180. If it is desired to use the seat with the side wings projecting, the inertia weights 190 and 192 can be pulled out manually.

Figure 28:
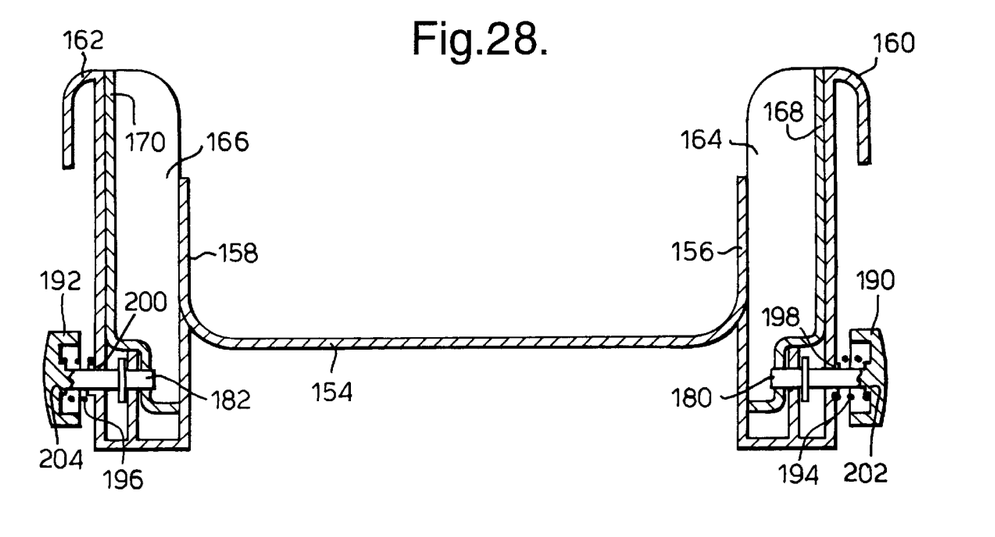
FIG. 28 is a cross-sectional view, similar to FIG. 26, showing modified latches for the side wings.

FIG. 28 illustrates a modification in which the compression springs 186 and 188 are replaced by respective tension springs 194 and 196, each of which has one end forming an interference fit a respective boss 198, 200 on the corresponding outer side wall 160, 162. The other end of each tension springs 194, 196 is an interference fit on a similar boss 202, 204 on the corresponding inertia weight 190, 192.

What is claimed is:

1. A child safety seat for use in a vehicle, the child seat comprising:

a seat body having a seat portion and a backrest, side wings movably mounted on the seat body so as to project from each side of the backrest at a level of a head of a child occupant of the seat, an inertia sensor, and drive means for moving the movable side wings relative to the backrest from a normal position to a fully deployed position, in which the movable side wings project from the backrest to a greater extent than when in the normal position of the movable side wings, in response to actuation of the inertia sensor.

2. A child safety seat according to claim 1, wherein the drive means comprises resilient means arranged to urge the movable side wings into their fully deployed position.

3. A child safety seat according to claim 2, wherein the drive means includes a catch for holding the movable side wings in their normal position and the inertia sensor is arranged to cause disengagement of the catch.

4. A child safety seat according to claim 3, wherein the catch comprises a respective plunger for each movable side wing, each plunger being resiliently biased into engagement with the corresponding side wing and having an inertia weight mounted thereon.

5. A child safety seat according to claim 3, wherein the catch comprises a pair of rods each held in engagement with a respective movable side wing by an inertia trigger, each plunger being resiliently biased out of engagement with the corresponding side wing.

6. A child safety seat according to claim 5, wherein the inertia trigger comprises a sliding weight.

7. A child safety seat according to claim 5, wherein the inertia trigger comprises a pendulum.

8. A child safety seat according to claim 7, wherein the pendulum is mounted in gimbals.

9. A child safety seat according to claim 5, wherein the inertia trigger comprises a sphere located on a concave support.

10. A child safety seat according to claim 1, wherein a mass of the inertia sensor comprises an inertia mass arranged to cause movement of the movable side wings from their normal position to their fully deployed position.

11. A child safety seat according to claim 10, wherein the drive means comprises a pair of semi-rigid pushers extending from an end of each movable side wing nearer to the backrest, round a respective curved slide guide and across a rear surface of the backrest into alignment with the inertia mass.

12. A child safety seat according to claim 11, wherein the inertia sensor is slidably mounted in a guide channel which extends horizontally on the rear surface of the backrest.

13. A child safety seat according to claim 12, wherein the inertia sensor includes a ball catch which is urged into engagement with a concave formation on the inertia mass by a compression spring.

14. A child safety seat according to claim 10, wherein the inertia sensor is slidably mounted in a guide channel which extends horizontally a rear surface of the backrest.

15. A child safety seat according to claim 14, wherein the inertia sensor includes a ball catch which is urged into engagement with a concave formation on the inertia mass by a compression spring.

16. A child safety sear for use in a vehicle, comprising:

a seat body having a seat portion and a backrest, side wings movably mounted on the seat body so as to project from each side of the backrest at the level of the head of a child occupant of the seat, and fixed side wings projecting parallel to the moveable side wings, the side wings being pivotally mounted on the seat body for angular movement about a horizontal axis so as to be displaceable between a normal position and a fully deployed position in which they project from the backrest to a greater extent than when in their normal position, and each movable side wing overlapping an associated fixed side wing when in its normal position and projecting therefrom when in its fully deployed position.

* * * * *